US010583885B2

(12) United States Patent
Raffaelli (10) Patent No.: US 10,583,885 B2
(45) Date of Patent: Mar. 10, 2020

(54) FORECARRIAGE OF TILTING MOTOR VEHICLE AND MOTOR VEHICLE THEREOF

(71) Applicant: PIAGGIO & C. S.p.A., Pontedera, Pisa (IT)

(72) Inventor: Andrea Raffaelli, Pisa (IT)

(73) Assignee: PIAGGIO & C. S.P.A., Pontedera, Pisa (IT)

( * ) Notice: Subject to any disclaimer, the term of this patent is extended or adjusted under 35 U.S.C. 154(b) by 67 days.

(21) Appl. No.: 15/748,242

(22) PCT Filed: Jul. 28, 2016

(86) PCT No.: PCT/IB2016/054524
§ 371 (c)(1),
(2) Date: Jan. 29, 2018

(87) PCT Pub. No.: WO2017/017639
PCT Pub. Date: Feb. 2, 2017

(65) Prior Publication Data
US 2018/0215433 A1    Aug. 2, 2018

(30) Foreign Application Priority Data
Jul. 29, 2015   (IT) ............................. M2015A9549

(51) Int. Cl.
*B62K 5/10*   (2013.01)
*B62K 5/08*   (2006.01)
(Continued)

(52) U.S. Cl.
CPC ................. *B62K 5/10* (2013.01); *B62D 9/02* (2013.01); *B62K 5/01* (2013.01); *B62K 5/027* (2013.01); *B62K 5/08* (2013.01); *B62K 2005/001* (2013.01)

(58) Field of Classification Search
CPC ............... B62D 9/02; B62K 5/10; B62K 5/08
See application file for complete search history.

(56) References Cited

U.S. PATENT DOCUMENTS 4,550,926 A * 11/1985  MacIsaac ................. B60G 3/18
                                                  280/124.103
4,887,829 A * 12/1989  Prince .................... B60G 21/05
                                                       280/282
(Continued)

FOREIGN PATENT DOCUMENTS

EP    3144164 A1 *  3/2017 ............. B62K 25/16
JP    2016175438 A * 10/2016 ............... B62D 9/02
(Continued)

*Primary Examiner* — Nicole T Verley
(74) *Attorney, Agent, or Firm* — Arent Fox LLP; Michael Fainberg (57) ABSTRACT

A motor vehicle forecarriage comprises a forecarriage frame, a pair of front wheels kinematically connected to the forecarriage frame by means of an articulated quadrilateral, said articulated quadrilateral comprising a pair of cross members, hinged to the forecarriage frame in correspondence of middle hinges, said cross members being connected together, in correspondence of opposite transverse ends by means of uprights pivoted to said transverse ends in correspondence of side hinges, wherein the cross members and the uprights define said articulated quadrilateral. Advantageously, each of the uprights guides and supports a stub axle of a front wheel, each upright extending from an upper end to a lower end, wherein each stub axle is mechanically connected to a rotation pin of a front wheel so as to rotatably support the wheel around a relative rotation axis.

27 Claims, 10 Drawing Sheets (51) Int. Cl.
  *B62K 5/027* (2013.01)
  *B62K 5/01* (2013.01)
  *B62D 9/02* (2006.01)
  *B62K 5/00* (2013.01)

(56) References Cited

U.S. PATENT DOCUMENTS

| | | | | |
|---|---|---|---|---|
| 5,762,351 | A * | 6/1998 | SooHoo | B60G 21/007 |
| | | | | 180/210 |
| 7,377,522 | B2 * | 5/2008 | MacIsaac | B60G 3/01 |
| | | | | 280/5.506 |
| 7,487,985 | B1 * | 2/2009 | Mighell | B62K 5/027 |
| | | | | 180/210 |
| 7,568,541 | B2 * | 8/2009 | Pfeil | B60G 21/007 |
| | | | | 180/210 |
| 7,571,787 | B2 * | 8/2009 | Saiki | B60G 7/00 |
| | | | | 180/210 |
| 7,850,180 | B2 * | 12/2010 | Wilcox | B60G 7/008 |
| | | | | 180/210 |
| 8,123,240 | B2 * | 2/2012 | Mercier | B62D 9/02 |
| | | | | 280/124.103 |
| 8,419,027 | B2 * | 4/2013 | Ting | B62K 5/02 |
| | | | | 280/124.103 |
| 8,814,186 | B1 * | 8/2014 | Rinda | B62K 5/06 |
| | | | | 280/93.504 |
| 8,818,700 | B2 * | 8/2014 | Moulene | G05D 1/0891 |
| | | | | 180/199 |
| 9,037,347 | B2 * | 5/2015 | Hayashi | B60G 17/015 |
| | | | | 313/146 |
| 9,216,790 | B2 * | 12/2015 | Takano | B60G 17/005 |
| 9,296,420 | B2 * | 3/2016 | Sasaki | B62J 15/00 |
| 9,340,249 | B2 * | 5/2016 | Takano | B62K 21/00 |
| 9,527,543 | B2 * | 12/2016 | Mercier | B62K 5/05 |
| 9,545,967 | B2 * | 1/2017 | Takano | B62K 21/00 |
| 9,586,642 | B2 * | 3/2017 | Mori | B62K 5/10 |
| 9,688,339 | B2 * | 6/2017 | Hirayama | B62K 5/05 |
| 9,725,130 | B2 * | 8/2017 | Takano | B62K 5/05 |
| 9,776,680 | B2 * | 10/2017 | Hirakawa | B62K 5/05 |
| 9,855,807 | B2 * | 1/2018 | Mori | B60G 3/26 |
| 9,981,708 | B2 * | 5/2018 | Ohno | B62K 5/027 |
| 2004/0140645 | A1 * | 7/2004 | Hayashi | B62K 5/05 |
| | | | | 280/282 |
| 2006/0151232 | A1 * | 7/2006 | Marcacci | B60G 21/007 |
| | | | | 180/414 |
| 2007/0029751 | A1 * | 2/2007 | Marcacci | B62D 9/02 |
| | | | | 280/124.1 |
| 2008/0238005 | A1 | 10/2008 | James | |
| 2011/0275256 | A1 * | 11/2011 | Gibbs | B60F 3/0007 |
| | | | | 440/12.51 |
| 2012/0181768 | A1 * | 7/2012 | MacIsaac | B60G 3/01 |
| | | | | 280/124.103 |
| 2015/0197304 | A1 * | 7/2015 | Kroening, Jr. | B62K 13/04 |
| | | | | 180/209 |
| 2018/0222527 | A1 * | 8/2018 | Raffaelli | B62D 9/02 |
| 2018/0237094 | A1 * | 8/2018 | Fischer | B62K 5/06 |
| 2018/0265156 | A1 * | 9/2018 | Hara | B62D 5/046 |
| 2018/0327044 | A1 * | 11/2018 | Raffaelli | B62K 5/06 |

FOREIGN PATENT DOCUMENTS

| | | | | |
|---|---|---|---|---|
| WO | 2013/005007 A | 1/2013 | | |
| WO | WO-2019060966 A1 * | 4/2019 | | B60G 3/01 |

* cited by examiner

FORECARRIAGE OF TILTING MOTOR VEHICLE AND MOTOR VEHICLE THEREOF

CROSS-REFERENCE TO RELATED APPLICATIONS

This application is the U.S. National Stage Application of International Patent Application No. PCT/IB2016/054524, filed on Jul. 28, 2016, which claims priority to Italian Patent Application No. 102015000039549, filed on Jul. 29, 2015, the contents of each of which is incorporated herein by reference in its entirety.

FIELD OF APPLICATION

The present invention relates to a forecarriage of a tilting motor vehicle and a motor vehicle thereof.

STATE OF THE ART

As is known, three-wheeled motor vehicles exist in the art with a rear drive wheel and two steering and tilting wheels. i.e. rolling or inclining, at the front.

Therefore, the rear wheel is intended to provide torque and thus allow traction while the front wheels, paired, are intended to provide the directionality of the vehicle.

Using two front wheels, instead of two rear wheels, avoids the use of a differential for torque transmission. This way a reduction of costs and weights at the rear axle can be achieved.

The paired wheels at the forecarriage in addition to steering, can tilt and roll: this way, compared with the three-wheeled vehicles with two wheels at the rear axle, vehicles with two wheels at the forecarriage are equivalent to an actual motorbike since, just like a motorbike, the vehicle is able to tilt when cornering.

Compared to a motor vehicle with only two-wheels, such vehicles with two paired wheels on the forecarriage have however a greater stability ensured by the dual resting on the ground of the front wheels, similar to that provided by a car.

The front wheels are kinematically connected to each other by means of kinematic mechanisms which enable the same to roll and/or steer synchronously and in a specular manner for example through the interposition of articulated quadrilaterals.

As regards the steering angle of the front wheels, it is also possible to provide for different steering angles between the front wheels, for example if you take a car type steering, where the outer wheel remains more open when cornering.

Tilting three-wheeled motor vehicles are thus designed to provide the user with the handling of a two-wheel motorcycle and, at the same time, the stability and safety of a four-wheeled vehicle.

In fact the two predefined goals are antithetical since greater stability requires the presence of additional elements compared to a two-wheeled motor vehicle (such as the third wheel and its relative kinematic mechanisms) which inevitably weigh down the structure of the vehicle.

Moreover, the presence of 'only' three wheels cannot per force guarantee the stability and roadholding of a four-wheeled vehicle.

Therefore, it is essential to develop a three-wheeled vehicle that can mediate these antithetical objectives, while ensuring stability and handling, as well as reliability and low costs.

To achieve such purposes a specific geometry of the front portion of the frame or forecarriage must be developed, responsible for supporting the front wheels in their steering and rolling or tilting movement.

PRESENTATION OF THE INVENTION

To resolve the aforesaid problems, to date many solutions have been adopted in the art of three-wheeled vehicles, of which two on the forecarriage.

Such solutions of the prior art fail to optimise the need for stability and handling described above.

The need is therefore felt to resolve the drawbacks and limitations mentioned with reference to the prior art.

This requirement is satisfied by a motor vehicle forecarriage according to claim 1 and by a motor vehicle according to claim 26.

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

With reference to the aforementioned figures, reference numeral 4 globally denotes a schematic overall view of a motor vehicle according to the present invention.

For the purposes of the present invention, it should be pointed out that the term motor vehicle should be considered in a broad sense, encompassing any motor cycle having at least three wheels, i.e. two aligned wheels, as described better below and at least one rear wheel. Such definition therefore also comprises so-called quad bikes having two wheels on the forecarriage and two wheels on the rear axle.

The motor vehicle 4 comprises a frame 6 extending from a forecarriage 8, supporting at least two front wheels 10, to a rear axle 12 supporting one or more rear wheels 14. It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and " to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth.

The frame 6 of the motor vehicle can be in one piece or in multiple parts; for example the frame 6 of the motor vehicle interconnects with a rear axle frame 13 which may comprise an oscillating rear fork (not shown) which supports one or more rear drive wheels 14.

Said rear oscillating fork may be connected to the frame 6 by direct hinging, or by the interposition of a lever mechanism and/or intermediate frames.

The motor vehicle forecarriage 8 comprises a forecarriage frame 16 and a pair of front wheels 10 kinematically connected to the forecarriage frame 16 by means of an articulated quadrilateral 20.

The articulated quadrilateral 20 comprises a pair of cross members 24 hinged to the forecarriage frame 16 in correspondence of middle hinges 28.

The middle hinges 28 identify middle hinge axes W-W parallel to each other.

For example said middle hinges are fitted on a front beam 32, positioned to straddle a centreline plane M-M passing through a longitudinal direction X-X or the direction of travel of the motor vehicle.

For example, a steering mechanism 36, connected to a handlebar (not shown) of the motor vehicle 4, is pivoted on a steering column 35 inserted so as to swivel in a steering tube 34 of the frame 6 of the motor vehicle 4.

The cross members 24 extend in a main transverse direction Y-Y between opposite transverse ends 40,44.

In particular, said cross members 24 are connected together, in correspondence of said opposite transverse ends 40, 44, by means of uprights 48, pivoted to said transverse ends 40, 44 in correspondence of side hinges 52.

In one embodiment the cross members 24, 24', 24" are mounted cantilevered with respect to the front beam 32.

The cross members 24 and the uprights 48 define said articulated quadrilateral 20. In particular the quadrilateral comprises two cross members 24, i.e. a top cross member 24' and a bottom cross member 24", in which the top cross member is facing the side of the associable handlebar and the bottom cross member 24" is facing towards the ground supporting the motor vehicle.

The cross members are not necessarily the same as each other in terms of shape, materials and size; each cross member 24 can be made in one piece or in two or more parts mechanically attached, for example by welding, bolts, rivets and similar.

There are two uprights 48, in particular a left upright 48' and a right upright 48".

The definition of left and right upright 48', 48" is purely formal and means in relation to a driver of the vehicle. Said left and right uprights 48', 48" are arranged to the left and right of a centreline plane M-M of the motor vehicle, compared to a point of observation of a driver driving it.

The side hinges 52 are parallel to each other and define respective side hinge axes Z-Z.

Preferably, said middle 28 and side hinges 52 are oriented according to middle W-W and side Z-Z hinge axes parallel to each other.

The left and right uprights 48', 48" rotatably support the left and right front wheels 10', 10", respectively, around respective steering axes S'-S', S"-S". Said steering axes S'-S',S"-S" are parallel to each other.

According to a possible embodiment, the hinges 28 and 52 are parallel to each other and perpendicular to said steering axes S'-S', S"-S". In other words, according to one embodiment, compared to a projection plane P passing through said middle hinges 28, the steering axes S'-S', S"-S" identify with the middle W-W and lateral hinge axes an angle α of 90 degrees.

According to possible embodiments, said angle α is between 80 and 120 degrees and preferably said angle α is between 90 and 110 degrees; even more preferably said angle value α is equal to 100 degrees.

The steering axes S'-S', S"-S" with respect to said projection plane P, may be inclined by a steering angle β between 5 and 20 degrees, and preferably between 8 and 16 degrees with respect to a vertical direction N-N, perpendicular to the ground.

According to further embodiments, it is also possible to provide that the hinges 28 and 52 are tilted according to middle W-W and lateral hinge axes Z-Z side parallel to the ground, i.e. perpendicular to said vertical direction N-N with respect to said projection plane P: in this configuration, said angle β is equal to 0 degrees Furthermore, as seen, it is also possible to provide that the hinges 28 and 52 are not perpendicular to the steering axes S'-S', S"-S": in fact, as described above, said angle α, defined between the steering axes S'-S', S"-S' and the middle W-W and side hinges Z-Z with respect to a projection plane P passing through said middle hinges 28, may be comprised between 80 and 120 degrees and, preferably, said angle α is comprised between 90 and 110 degrees; even more preferably said angle α value is equal to 100 degrees.

The parallelism to the ground of the middle W-W and side hinge axes Z-Z means that, in the rolling motion, the inner wheel with respect to the curve rises upwards almost vertically with the double advantage of uncoupling the rolling motion of the wheel from horizontal braking forces (transmitted from the ground) and of taking up less space towards the bottom of the motor vehicle.

Figure 1:
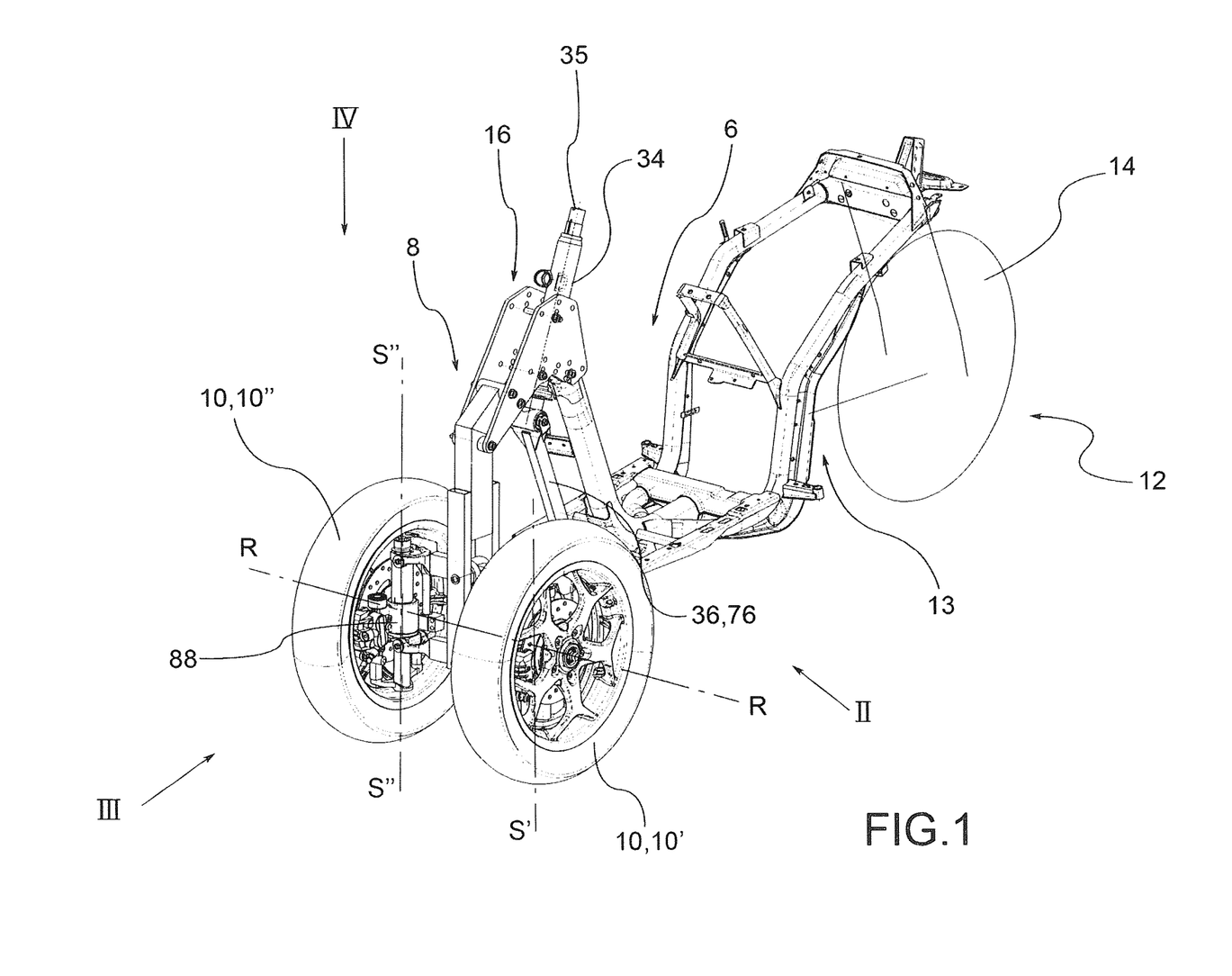
FIG. 1 is a partial perspective view of a motor vehicle comprising a forecarriage according to the present invention.
Figure 2:
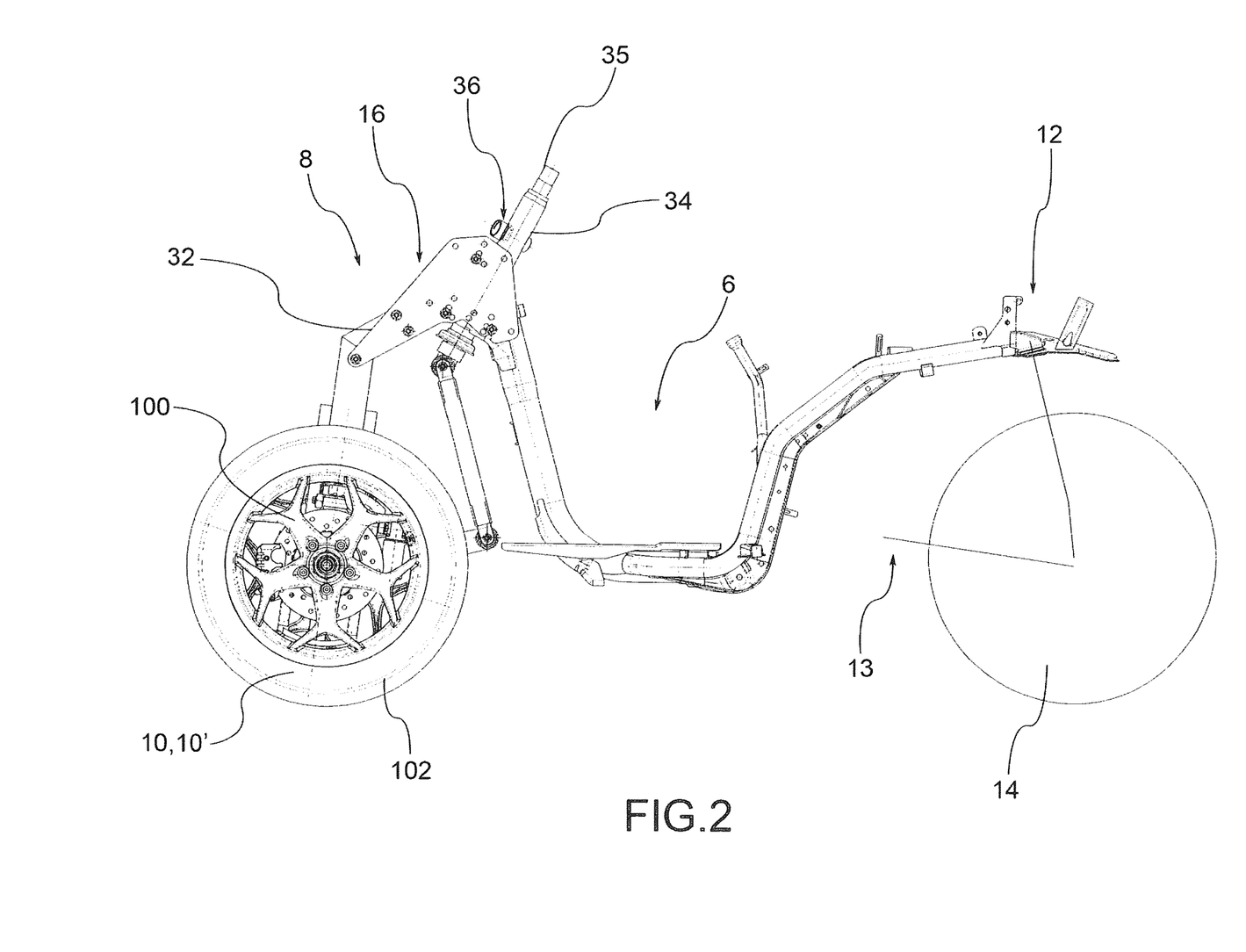
FIG. 2 shows a side view of the motor vehicle in FIG. 1 from the side of the arrow II in FIG. 1.
Figure 3:
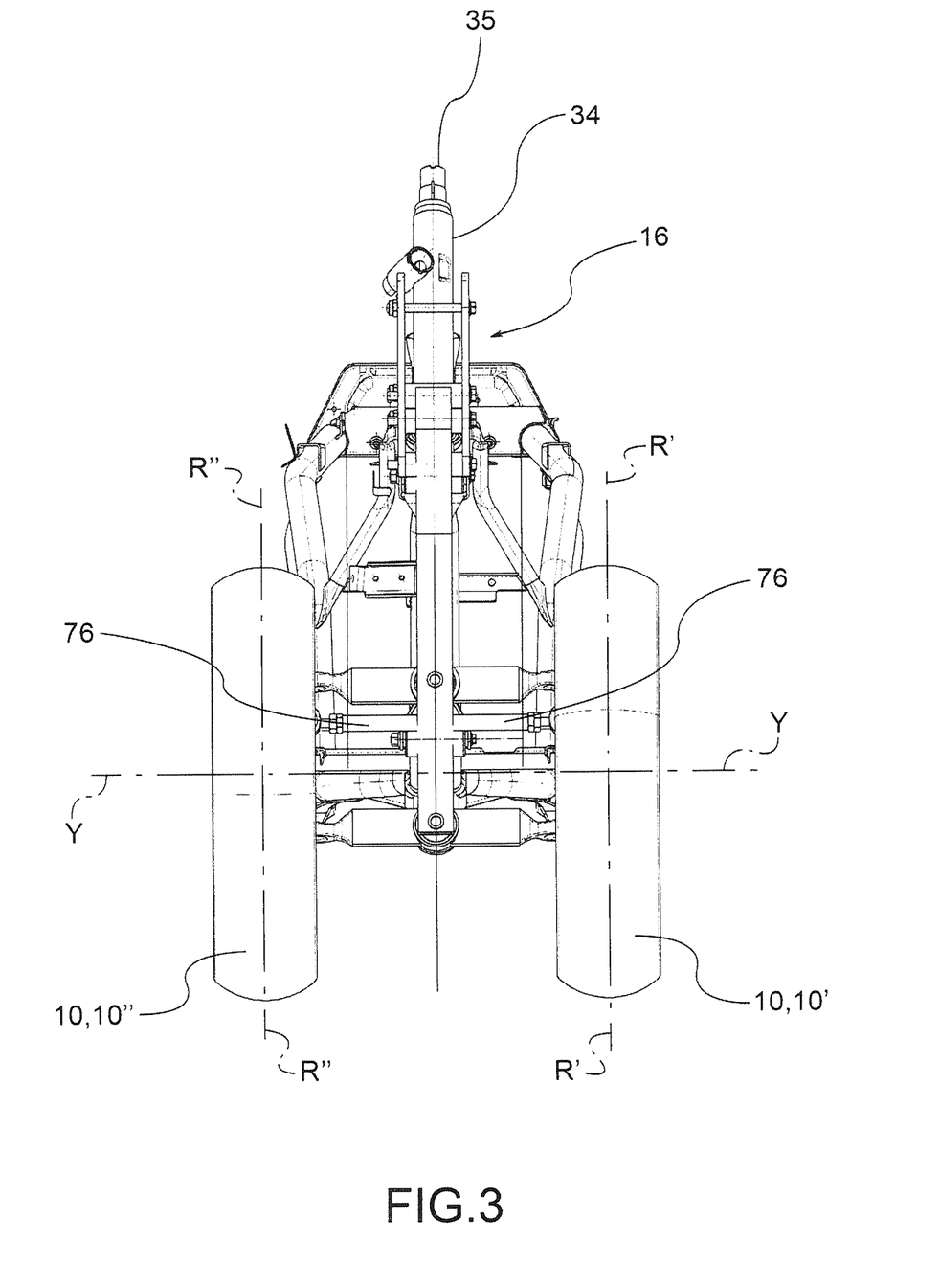
FIG. 3 shows a front view of the motor vehicle in FIG. 1 from the side of the arrow III in FIG. 1.
Figure 4:
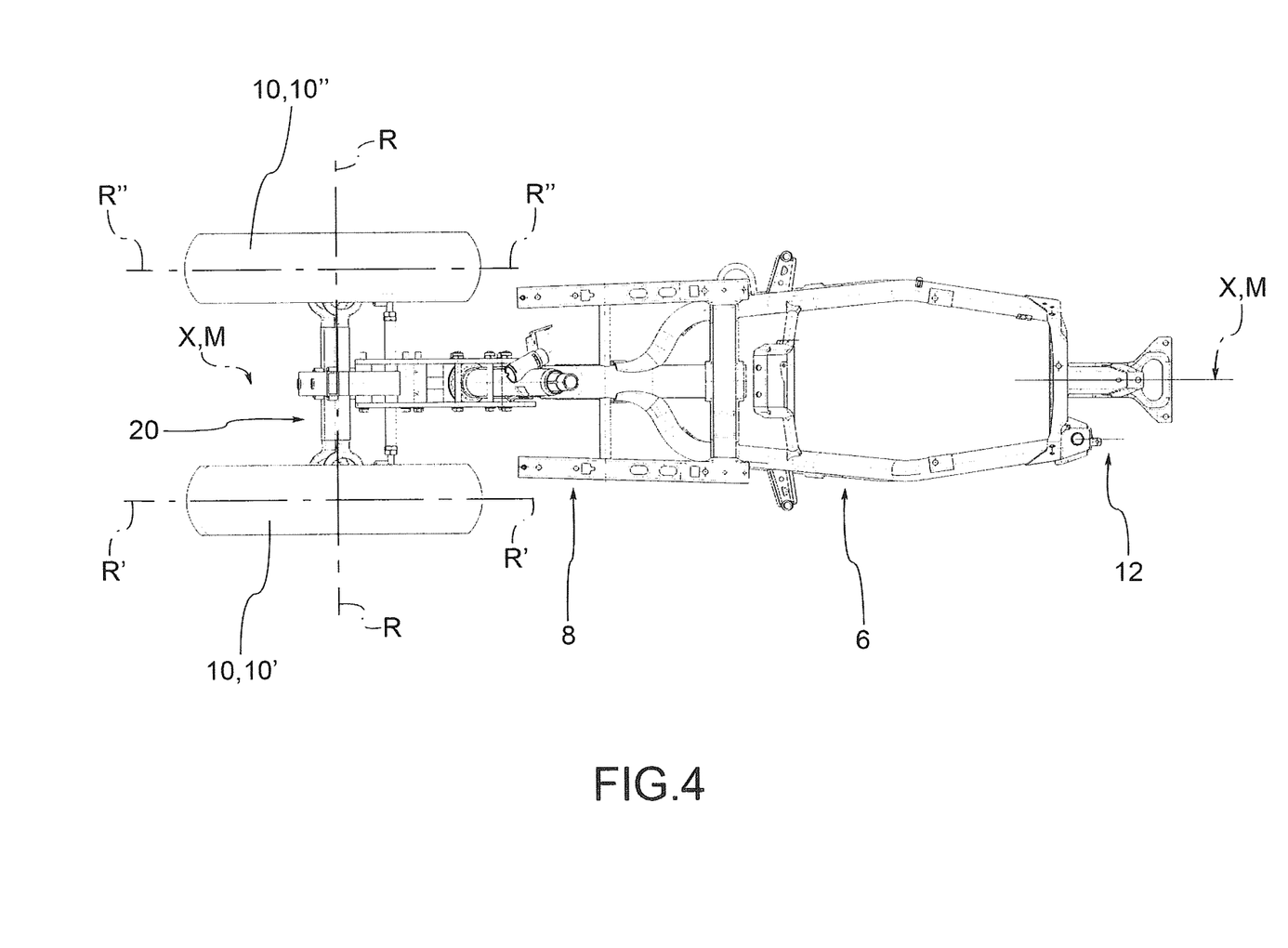
FIG. 4 shows a plan view of the motor vehicle in FIG. 1 from the side of the arrow IV in FIG. 1.
Figure 5:
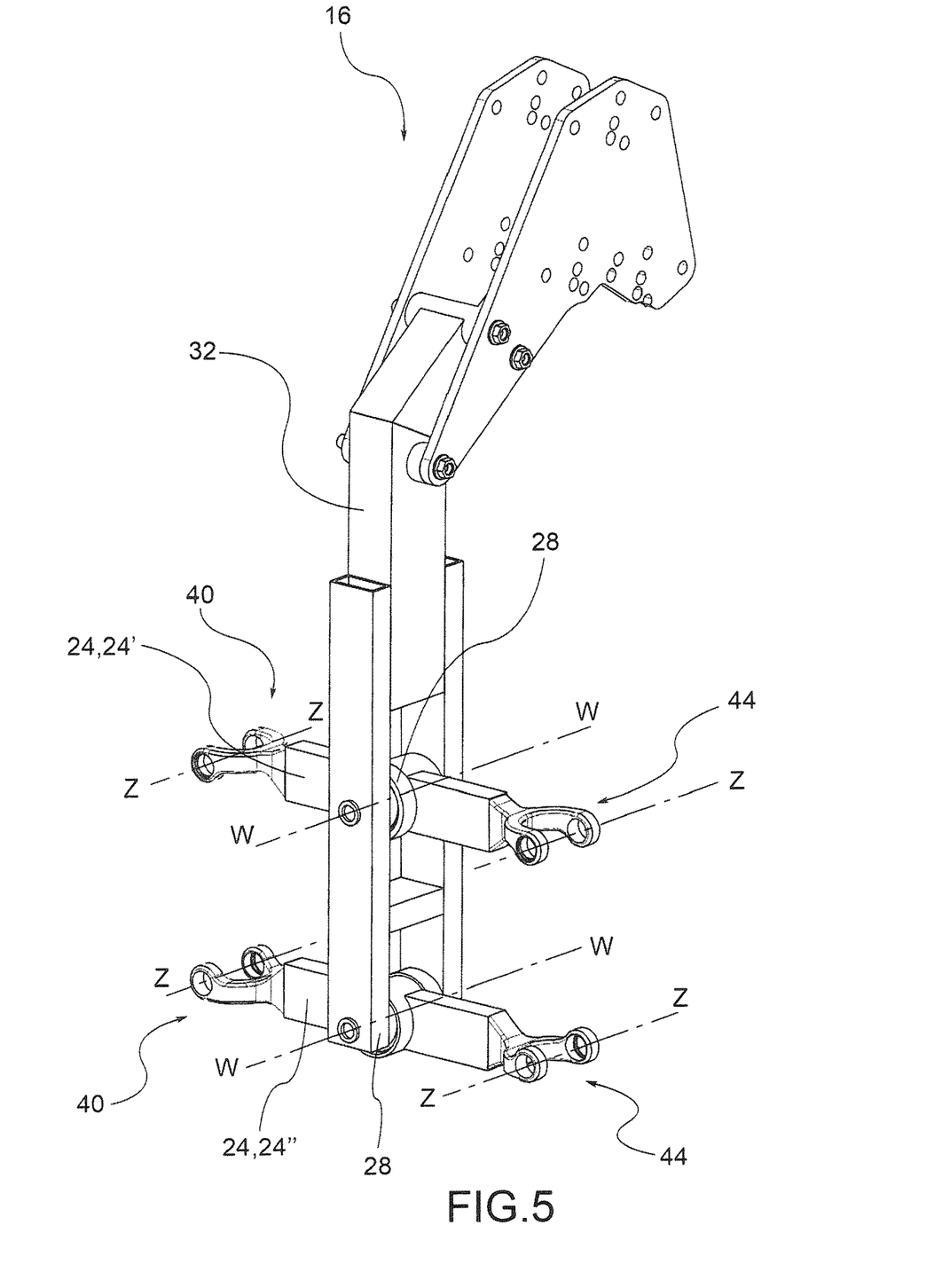
FIGS. 5-6 show partial perspective views of motor vehicle forecarriages according to the present invention.
Figure 6:
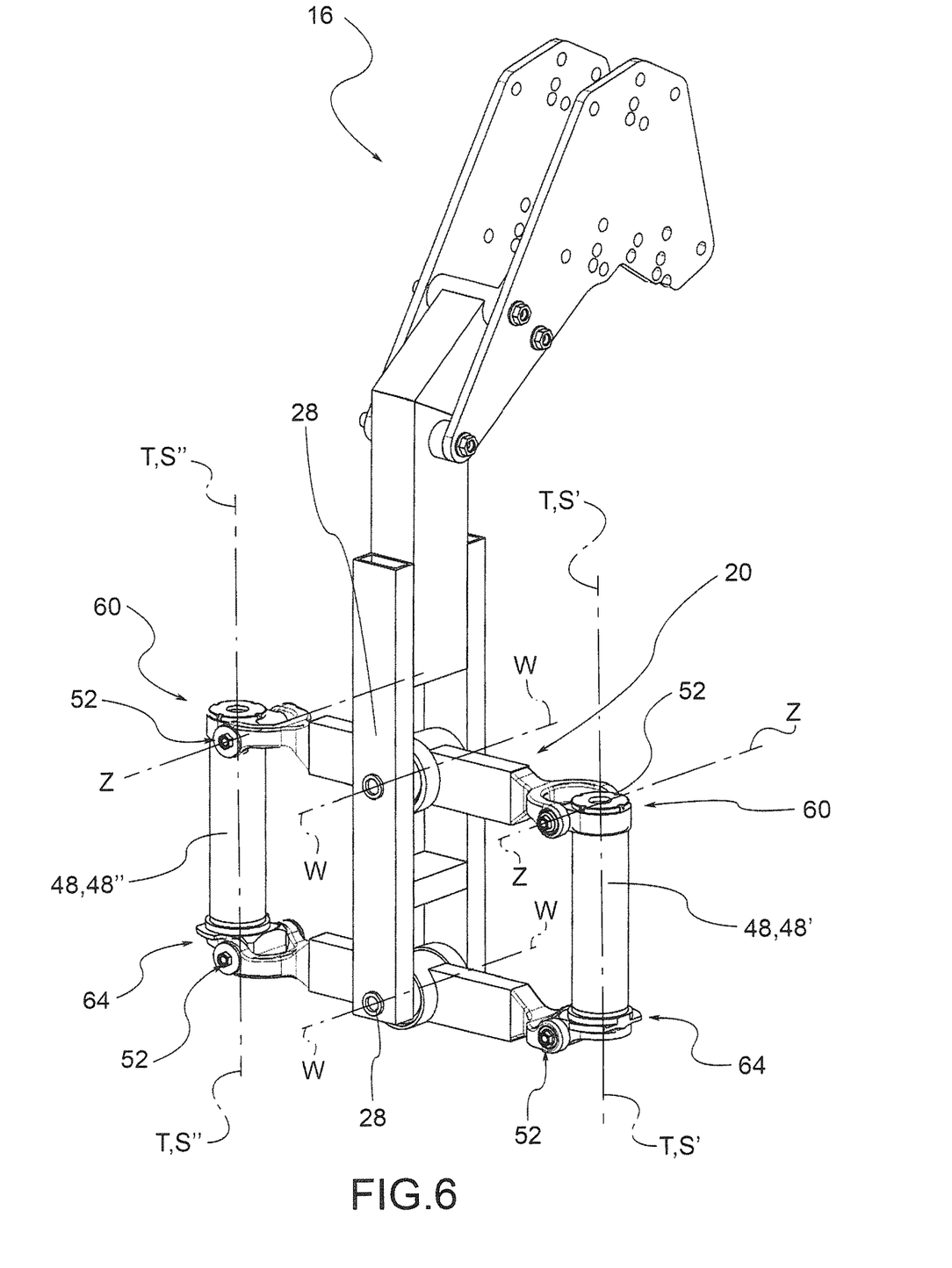
Figure 7A:
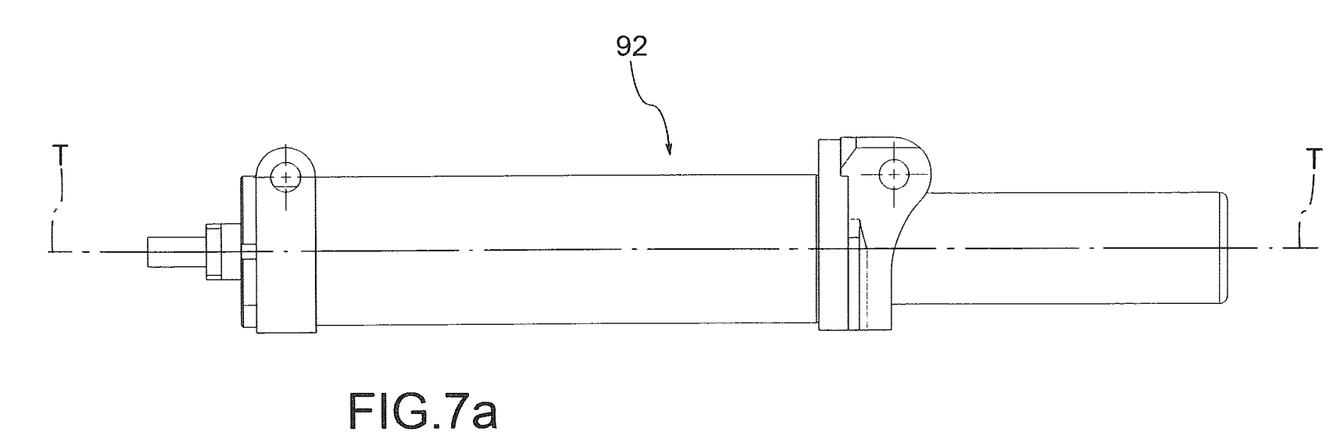
FIGS. 7a-7b respectively shows a perspective view and a cross-section view of a suspension applied to a motor vehicle according to the present invention.
Figure 7B:
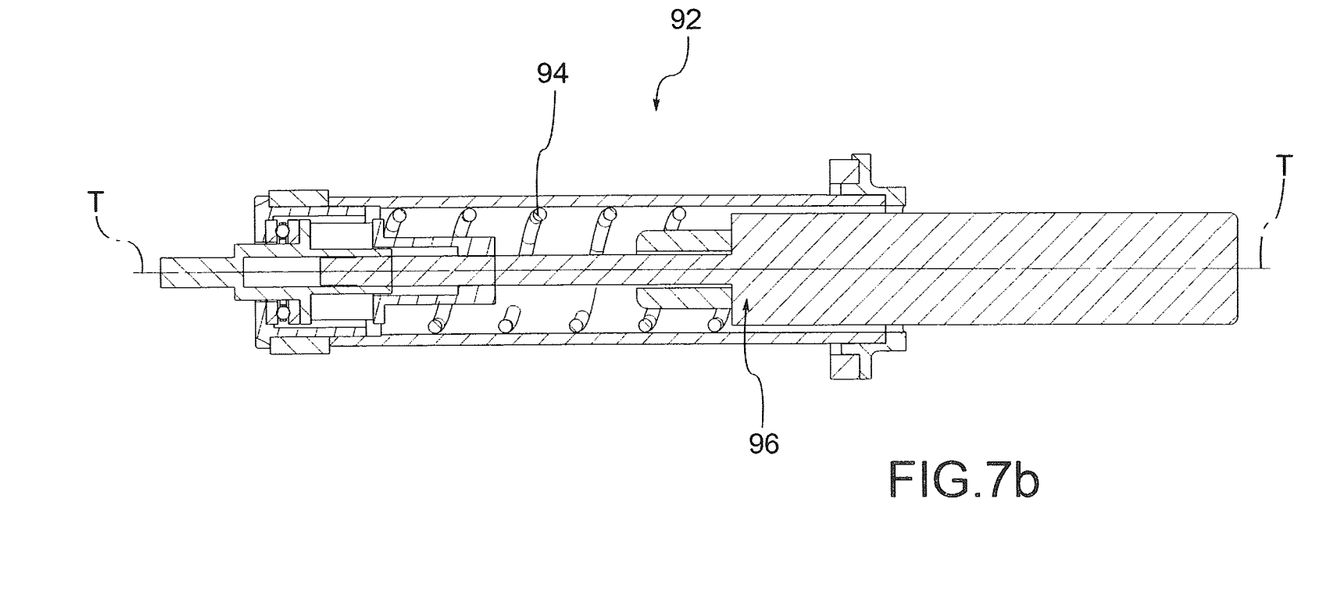
Figure 8:
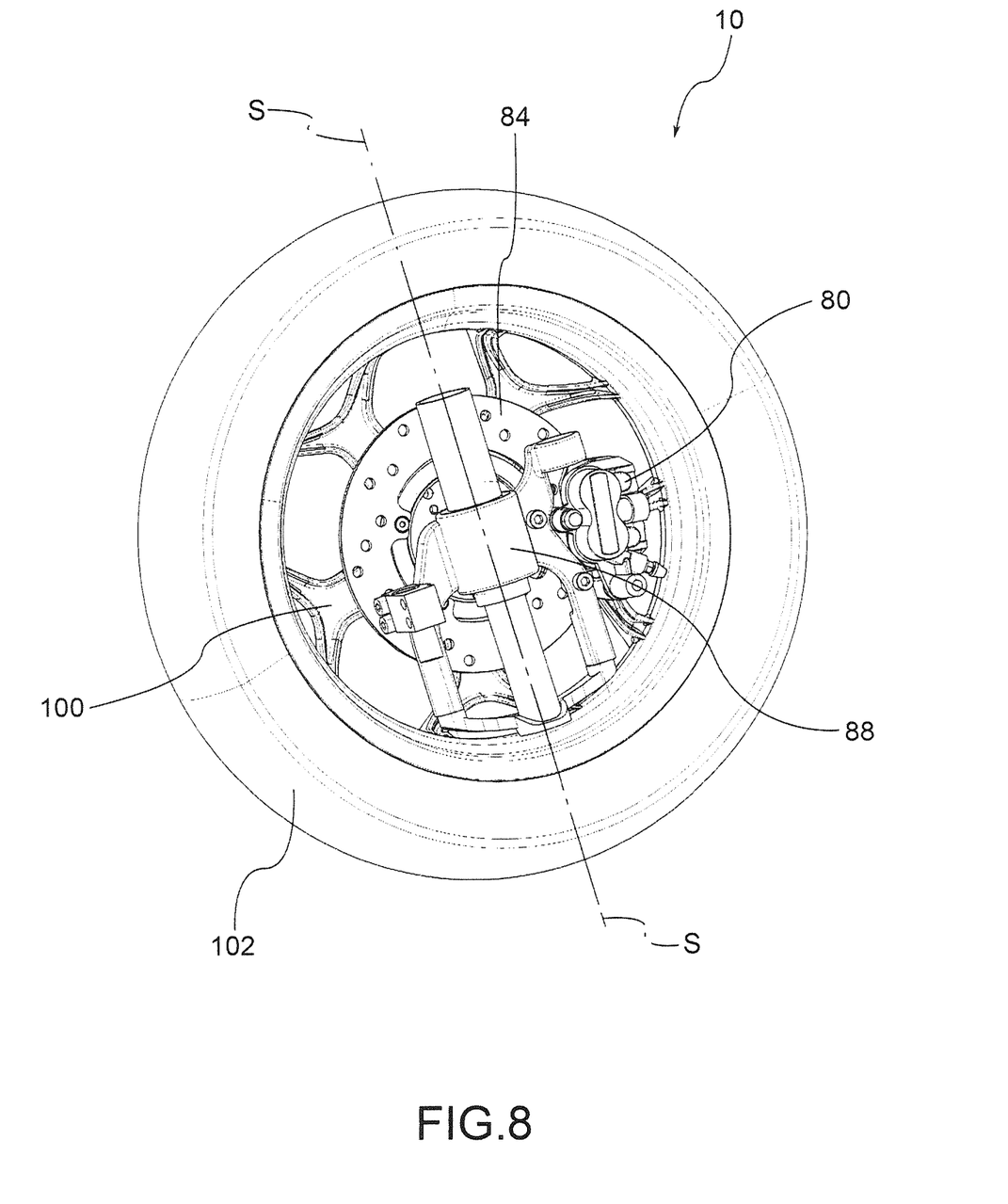
FIG. 8 shows a partial perspective view of a wheel of the motor vehicle according to the present invention.
Figure 9:
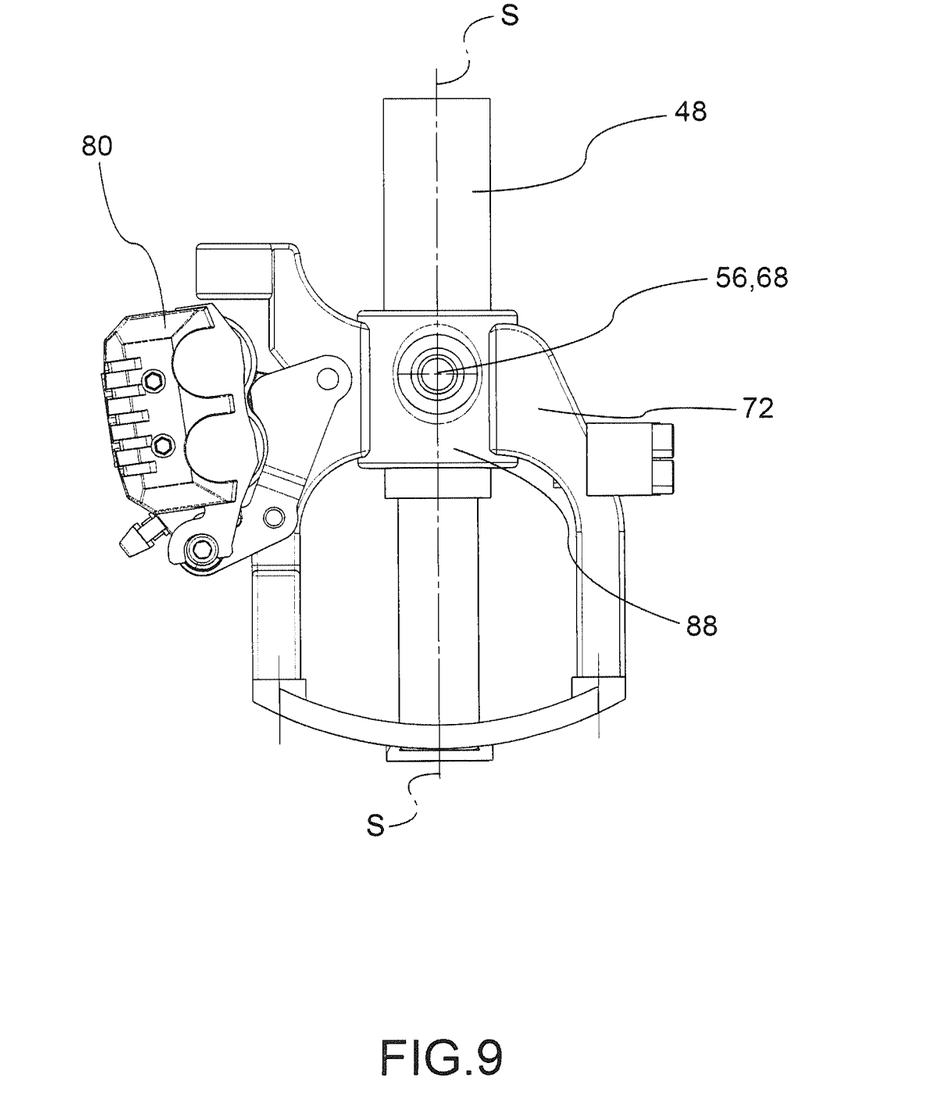
FIGS. 9-10 show partial side views of motor vehicle forecarriage components according to the present invention.
Figure 10:
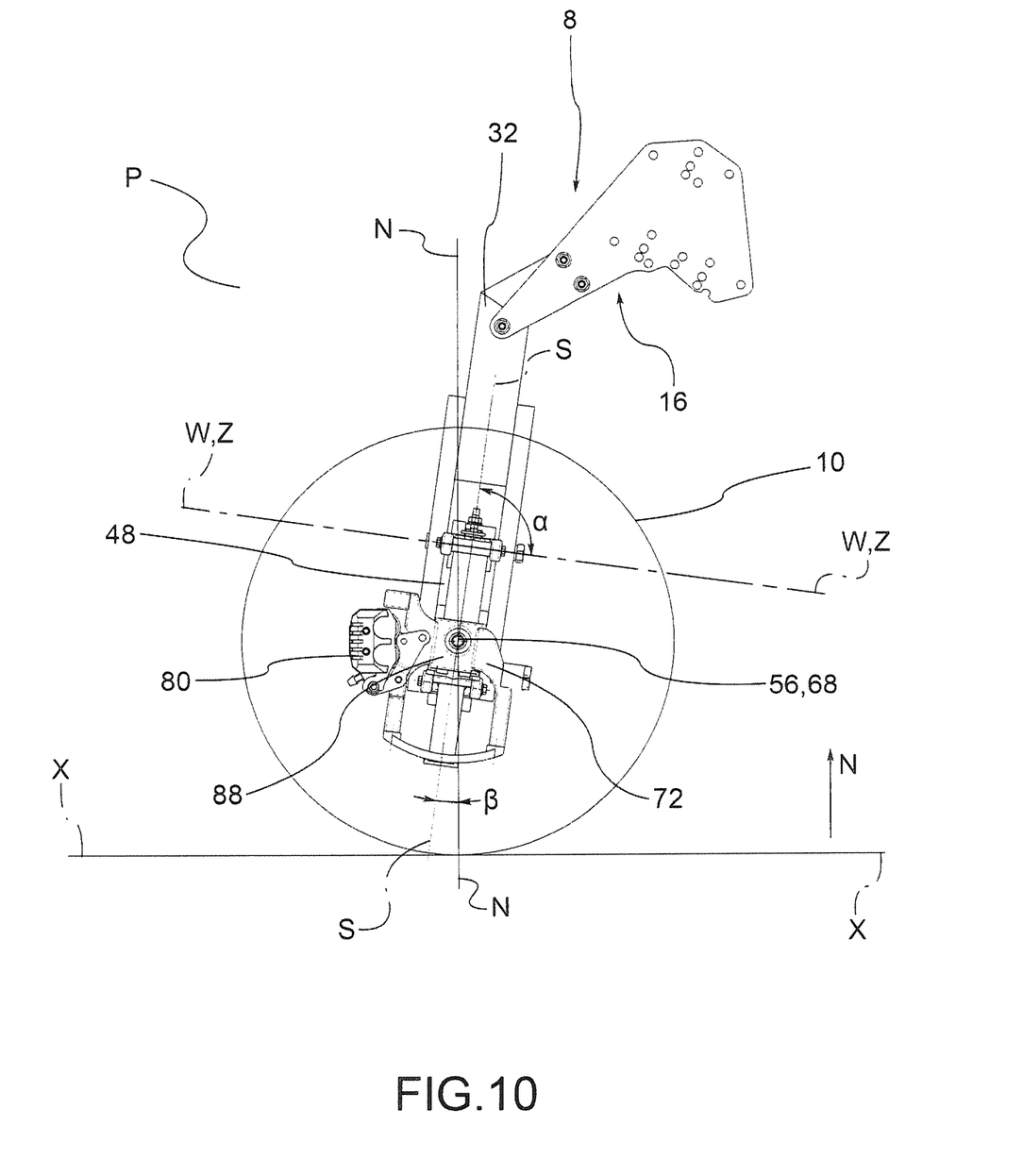

It should be noted that, by tilting the middle W-W and side axes Z-Z with respect to the steering axes S'-S', S"-S", so that in static conditions at rest said middle W-W and side hinge axes Z-Z are parallel to the ground, in braking conditions, and therefore compression of the suspensions of the front wheels 10', 10" said middle W-W and side hinge axes Z-Z are inclined moving into a condition of substantial parallelism to the ground. For example, looking at FIG. 10, if in static conditions the middle W-W and side hinge axes Z-Z identify an angle β different from zero with the horizontal direction (which coincides with the angle formed with the vertical direction, which is perpendicular to the horizontal direction), in braking and maximum compression conditions this angle tends to zero.

When, during braking, the middle W-W and side hinge axes Z-Z are arranged substantially parallel to the ground, the jumping of the wheels is avoided since the braking forces, horizontal and therefore parallel to the ground, do not produce components along the excursion movement of the wheels which is practically perpendicular to the ground, i.e. vertical.

Each of the uprights 48 guides and supports a stub axle 56 of a front wheel 10; each upright 48 extends from an upper end 60 to a lower end 64. The top end 60 is facing towards the upper cross member 24' and the lower end 64 is facing the bottom cross member 24".

According to one embodiment, each stub axle 56 is mechanically connected to a rotation pin 68 of a front wheel 10 so as to rotatably support the front wheel 10 around a related rotation axis R-R.

Advantageously, each rotation pin 68 of the front wheel 10 is comprised between the upper end 60 and the lower end 64 of the corresponding upright 48 of the articulated quadrilateral 20.

Preferably, each rotation pin 68 of each front wheel is comprised between adjacent side hinges 52 of the cross members 24 of the articulated quadrilateral 20.

The stub axle 56 of each wheel 10 is supported and guided by a single corresponding upright 48 of said articulated quadrilateral 20.

According to one embodiment, each stub axle 56 is mounted on a corresponding upright 48 so as to have at least one degree of freedom with respect to the corresponding upright 48, said at least one degree of freedom comprising a translational movement of the stub axle 56 with respect to the upright 48 parallel to an axis of prevalent extension T-T of the upright 48 and/or a rotational motion of the stub axle 56 about said axis of prevailing extension T-T of the upright 48.

According to a possible embodiment, the coupling between each stub axle 56 and the upright 48 is of the prismatic type, so as to allow only one degree of freedom to the stub axle 56 with respect to the upright 48, i.e., a translation of the stub axle 56 with respect to the upright 48 parallel to the main extension axis T-T of the upright 48. Said translation motion is also called shaking motion of the stub axle 56 and of the relative front wheel 10 connected thereto, which thus moves along a substantially straight trajectory.

Thanks to the prismatic coupling between each stub axle 56 and the corresponding upright 48, it is necessary to introduce a further element between the stub axle 56 and the respective guide so as to enable the steering of the wheel. In this way there is the possibility to offset the steering axis S-S of each front wheel 10 from a symmetry axis or axis of prevalent extension T-T of each upright 48; moreover with this configuration there is the possibility to have different inclinations between the steering axis S-S and the relative axis of prevalent extension T-T of each upright 48. Therefore it is possible to optimize the inclination of the steering axis S-S for improve the trail of the wheel; moreover it is possible to optimize the inclination of the axis of prevalent extension T-T of the upright for the bumping trajectory of the wheel and for the overall size with respect to the vehicle. Moreover, the stub axle 56 has not the function to contain the guide of each upright and it can be optimized to support the wheel during its rolling. For example it is possible to optimize the dimension and/or positioning of rolling bearings within the stub axle 56.

According to a further embodiment, the coupling between each stub axle 56 and the upright 48 is of the cylindrical type, so as to allow both translation and rotation of the stub axle 56 with respect to the axis of prevalent extension T-T of the upright 48.

Preferably, each front wheel 10 has a steering axis S-S that coincides with the axis of prevalent extension T-T and of symmetry of the upright 48 of the cylindrical type.

In addition, it should be noted that the middle hinges 28 and side hinges 52, which define the respective middle W-W and side axes Z-Z, are placed above and below the rotation pin 68 of the respective front wheels 10',10" and not completely over it, as occurs in the solutions of the prior art. In other words, with respect to the main extension axis T-T of each upright 48, each rotation pin 68 of the front wheel 10', 10" is comprised between the middle 28 and side hinges 52 respectively of the upper 24' and lower cross member 24" of the articulated quadrilateral.

This implies that the stiffness of the connection between each wheel 10',10" and the articulated quadrilateral, comprising the suspension, is a more rigid order of magnitude than happens in the aforementioned solutions of the prior art, helping to make the possibility more remote that an alternating resonance of the front wheels 10', 10" may take overdue to braking forces or an asymmetric impact. Consequently the present invention helps overall to provide a vehicle that is lightweight but also safe, precise and that conveys to the driver a feeling of safety at the forecarriage, in that it does not transmit to the user vibrations or flickering on the handlebar.

Furthermore, the positioning of the upper and lower 24', 24" cross members of the articulated quadrilateral in the vertical dimension of the wheels makes it possible to move the barycentre of the forecarriage, and therefore of the vehicle, downwards, improving the dynamic behaviour of the vehicle.

As regards the steering of the front wheels 10, according to one embodiment the forecarriage 8 comprises at least one bracket 72, connected to the stub axle 56 of the front wheel 10 and to steering levers 76 of the forecarriage 8, so as to control the rotation of the stub axles 56 about the respective steering axis S-S of each front wheel 10.

Preferably, the bracket 72 is integral, in one piece, with the stub axle 56 of each front wheel 10.

According to one embodiment, said bracket 72 supports braking means 80 for the wheel 10.

For example, said braking means 80 comprise a calliper for disc brake arranged astride a brake disc 84 integral in rotation with the wheel 10.

Preferably, the bracket 72 extends astride the upright 48 from the side of the lower end 64 of the upright 48.

Thanks to this architecture, the whole suspension is centred with respect to the relative upright and it is possible to avoid transversal bending moments.

Preferably, the stub axle 56 comprises a sleeve 88 placed coaxially to the upright 48.

According to one embodiment, between the stub axle 56 and the upright 48 are arranged suspension means 92 of the wheel 10.

For example, the suspension means 92 comprise a spring 94 and/or a damper 96.

According to one embodiment, the uprights 48 are hollow so as to house internally, at least partially, the suspension means.

The positioning of the suspension means within the uprights implies some advantages: for example the upright protect the suspension means, and it works in a purely compressive state, avoiding bending moments.

Preferably the suspension means 92 are arranged coaxially to the respective upright 48.

Each wheel 10 comprises a wheel rim 100 which supports a tyre 102 and that is rotatably supported by the related stub axle 56, wherein the stub axle 56 is at least partially housed in a volume delimited by said wheel rim 100.

Preferably, the stub axle 56 and the upright 48 are integrally housed in said volume delimited by the wheel rim 100.

In a preferred embodiment, each centreline plane of the wheel R'-R',R"-R" goes through the steering axis S'-S', S"-S" of each front wheel 10',10".

In a further embodiment, an offset or transverse overhang is provided between each steering axle S'-S', S"-S" and the relative centreline plane of the wheel R'-R', R"-R". Such transverse overhang is between 0 and 2 cm, more preferably between 0 and 1 cm, even more preferably said transverse overhang is equal to 0.7 cm.

Preferably, said volume bounded by the wheel rim 100 is facing with respect to a centreline plane M-M of the forecarriage passing through said middle hinges 28. In other words, the stub axles 56 are facing inward towards the centreline plane M-M of the motor vehicle and the relative components associated with the stub axles 56 are not directly visible to an outside observer.

As mentioned above, the vehicle 4 according to the present invention comprises at least one rear drive wheel drive 14; according to a possible embodiment, the vehicle has two rear drive wheels 14 at the rear axle 12.

For example, in this embodiment, in which the motor vehicle is a quadricycle, the rear drive wheels 14 at the rear axle 12 are connected to each other and to a rear axle frame 13 by means of an articulated quadrilateral 20 as described above in relation to the front wheels 10.

As may be appreciated from the description, the present invention makes it possible to overcome the drawbacks mentioned of the prior art.

In particular, the forecarriage has limited dimensions and weight.

In particular, the dimensions are particularly reduced given that all the main elements of the forecarriage are enclosed inside the footprint of the articulated quadrilateral.

In addition, the forecarriage components are at least partially contained in the volume delimited by each wheel rim.

The solution thus proves particularly compact.

Furthermore, the solution presents a particularly contained non-suspended mass since it is constituted solely by the wheel and by its relative stub axle.

The described solution falls within the case of interconnected suspensions since the balance to a load on a front wheel is found with an equal load on the conjugated front wheel; the load transfer occurs through the quadrilateral, and thus by means of its inertia which also involves that of the entire vehicle, and thus presents a delay of an entity related to said inertia.

In practice, the inertia interposed between the paired wheels acts so as to move the solution with interconnected wheels towards one with independent wheels favouring comfort and counteracting any resonance phenomena that could be triggered on the wheels, which would otherwise not be damped.

Therefore the motor vehicle according to the present invention is able to guarantee not only high stability, superior to that of a motor vehicle with two wheels, thanks to the presence of two paired front wheels, but also remarkable handling and ease of leaning, typical of a motor vehicle with only two wheels.

In addition, as described, the middle hinges and side hinges, which define the respective middle and side axes, are placed above and below the rotation pin of the respective front wheels and not completely over it, as occurs in the solutions of the prior art. This way, with respect to the main extension axis of each upright each rotation pin of the front wheel is comprised between the middle and side hinges respectively of the upper and lower cross member of the articulated quadrilateral. This implies that the stiffness of the connection between each wheel and the articulated quadrilateral, comprising the suspension, is a more rigid order of magnitude than happens in the aforementioned solutions of the prior art, helping to make the possibility more remote that an alternating resonance of the front wheels may take over due to braking forces or an asymmetric impact. Consequently the present invention helps overall to provide a vehicle that is lightweight but also safe, precise and that conveys to the driver a feeling of safety at the forecarriage, in that it does not transmit to the user vibrations or flickering on the handlebar.

A person skilled in the art may make numerous modifications and variations to the solutions described above so as to satisfy contingent and specific requirements while remaining within the sphere of protection of the invention as defined by the following claims.

The invention claimed is:

1. A motor vehicle forecarriage comprising:
   a forecarriage frame; and
   a pair of front wheels kinematically connected to the forecarriage frame by means of an articulated quadrilateral,
   said articulated quadrilateral comprising a pair of cross members, hinged to the forecarriage frame in correspondence of middle hinges,
   said cross members being connected together, in correspondence of opposite transverse ends, by means of uprights pivoted to said transverse ends in correspondence of side hinges,
   the cross members and the uprights defining said articulated quadrilateral, wherein,
   each of the uprights guides and supports a stub axle of a front wheel,
   each upright extends from an upper end to a lower end,
   suspension means of the front wheel are arranged between the stub axle and the upright,
   each stub axle is mechanically connected to a rotation pin of a front wheel so as to rotatably support the front wheel around a rotation axis, and
   each rotation pin of the front wheel is comprised between the upper end and the lower end of the corresponding upright of the articulated quadrilateral.

2. The motor vehicle forecarriage according to claim 1, wherein each rotation pin of each front wheel is comprised between adjacent side hinges of the cross members of the articulated quadrilateral.

3. The motor vehicle forecarriage according to claim 1, wherein the stub axle of each front wheel is supported and guided by a single corresponding left and right upright of said articulated quadrilateral.

4. The motor vehicle forecarriage according to claim 1, wherein the left and right uprights rotatably support the left and right front wheels, respectively, around respective steering axes parallel to each other.

5. The motor vehicle forecarriage according to claim 4, wherein the hinges are parallel to each other and are oriented so that, with respect to a projection plane passing through said middle hinges, the steering axes identify, with the axes of the middle hinge and side hinge, an angle α, said angle α being between 80 and 120 degrees.

6. The motor vehicle forecarriage according to claim 5, wherein the angle α is between 90 and 110 degrees.

7. The motor vehicle forecarriage according to claim 4, wherein the hinges are parallel to each other and orthogonal to said steering axes so that, with respect to a projection plane passing through said middle hinges the steering axes identify with the axes of the middle hinge and side hinge, an angle of 90 degrees.

8. The motor vehicle forecarriage according to claim 4, wherein the steering axes with respect to a projection plane passing through said middle hinges are inclined by a steering angle between 5 and 20 degrees with respect to a vertical direction, the vertical direction being perpendicular to the ground.

9. The motor vehicle forecarriage according to claim 8, wherein the steering angle is between 8 and 16 degrees.

10. The motor vehicle forecarriage according to claim 1, wherein the hinges are inclined according to the axes of the middle hinge and side hinge parallel to the ground, the incline angle parallel to the ground being perpendicular to a vertical direction, the vertical direction being perpendicular to the ground.

11. The motor vehicle forecarriage according to claim 1, wherein each stub axle is mounted on a corresponding upright so as to have at least one degree of freedom with respect to the corresponding upright, said at least one degree of freedom comprising a translational movement of the stub axle with respect to the upright parallel to an axis of prevalent extension of the upright and/or a rotational motion of the stub axle about said axis of prevailing extension of the upright.

12. The motor vehicle forecarriage according to claim 11, wherein the coupling between each stub axle and the upright is of the prismatic type, so as to allow only one degree of freedom to the stub axle with respect to the upright, the allowance of the one degree of freedom being for a translation of the stub axle with respect to the upright parallel to an axis of prevalent extension of the upright.

13. The motor vehicle forecarriage according to claim 11, wherein the coupling between each stub axle and the upright is of the cylindrical type, so as to allow both translation and rotation of the stub axle with respect to the axis of prevalent extension of the upright.

14. The motor vehicle forecarriage according to claim 13, wherein each front wheel has a steering axis that coincides with the axis of prevalent extension and of symmetry of the relative upright of the cylindrical type.

15. The motor vehicle forecarriage according to claim 1, wherein the forecarriage comprises at least one bracket, connected to the stub axle of the front wheel and steering levers of the forecarriage, so as to control the rotation of the stub axles about the respective steering axis of each front wheel.

16. The motor vehicle forecarriage according to claim 15, wherein said bracket supports braking means for the front wheel.

17. The motor vehicle forecarriage according to claim 16, wherein said braking means comprise a caliper for disc brake arranged astride of a brake disc integral in rotation with the front wheel.

18. The motor vehicle forecarriage according to claim 15, wherein said bracket extends astride the upright from the side of the lower end of the upright.

19. The motor vehicle forecarriage according to claim 1, in which the stub axle comprises a sleeve arranged coaxially to the upright.

20. The motor vehicle forecarriage according to claim 1, wherein said suspension means comprise a spring and/or a damper.

21. The motor vehicle forecarriage according to claim 1, wherein said uprights are hollow so as to house internally, at least partially, said suspension means of the front wheel.

22. The motor vehicle forecarriage according to claim 1, wherein said suspension means are arranged coaxially to the respective upright.

23. The motor vehicle forecarriage according to claim 1, wherein each front wheel comprises a wheel rim which supports a tire and that is rotatably supported by the related stub axle, wherein the stub axle is at least partially housed in a volume delimited by said wheel rim.

24. The motor vehicle forecarriage according to claim 23, wherein the stub axle and the upright are integrally housed in said volume delimited by the wheel rim.

25. The motor vehicle forecarriage according to claim 23, wherein said volume is facing with respect to a centreline plane of the forecarriage passing through said middle hinges.

26. The motor vehicle forecarriage according to claim 1, wherein said middle hinges and side hinges are oriented according to the axes of the middle hinge and side hinge parallel to each other.

27. The motor vehicle having a drive wheel at the rear axle and a forecarriage according to claim 1.

* * * * *

UNITED STATES PATENT AND TRADEMARK OFFICE
CERTIFICATE OF CORRECTION

| | | |
|---|---|---|
| PATENT NO. | : 10,583,885 B2 | Page 1 of 1 |
| APPLICATION NO. | : 15/748242 | |
| DATED | : March 10, 2020 | |
| INVENTOR(S) | : Andrea Raffaelli | |

It is certified that error appears in the above-identified patent and that said Letters Patent is hereby corrected as shown below:

On the Title Page

Item (30) Foreign Application Priority Data Reads:
(IT) ............................ M2015A9549

Should Read:
-- (IT) ............................ 102015000039549 --

Signed and Sealed this
Twenty-seventh Day of August, 2024

Katherine Kelly Vidal
*Director of the United States Patent and Trademark Office*